April 15, 1924.

F. THORNTON, JR

SECTIONAL BAKE OVEN

Filed March 17, 1922   7 Sheets-Sheet 1

1,490,243

WITNESSES:

INVENTOR
Frank Thornton, Jr.
BY
ATTORNEY

April 15, 1924.                    1,490,243
F. THORNTON, JR
SECTIONAL BAKE OVEN
Filed March 17, 1922    7 Sheets-Sheet 3

WITNESSES:

INVENTOR
Frank Thornton, Jr.
BY
ATTORNEY

April 15, 1924.

F. THORNTON, JR 1,490,243

SECTIONAL BAKE OVEN

Filed March 17, 1922   7 Sheets-Sheet 4

WITNESSES:
P. H. Crock.
H. M. Biebel

INVENTOR
Frank Thornton, Jr.
BY
Wesley G. Carr
ATTORNEY

April 15, 1924.

F. THORNTON, JR 1,490,243

SECTIONAL BAKE OVEN

Filed March 17, 1922     7 Sheets-Sheet 5

WITNESSES:

INVENTOR
Frank Thornton, Jr.
BY
ATTORNEY

April 15, 1924. 1,490,243

F. THORNTON, JR
SECTIONAL BAKE OVEN
Filed March 17, 1922  7 Sheets-Sheet 6

WITNESSES:
INVENTOR
Frank Thornton, Jr.
BY
ATTORNEY

April 15, 1924.
F. THORNTON, JR
1,490,243
SECTIONAL BAKE OVEN
Filed March 17, 1922 7 Sheets-Sheet 7
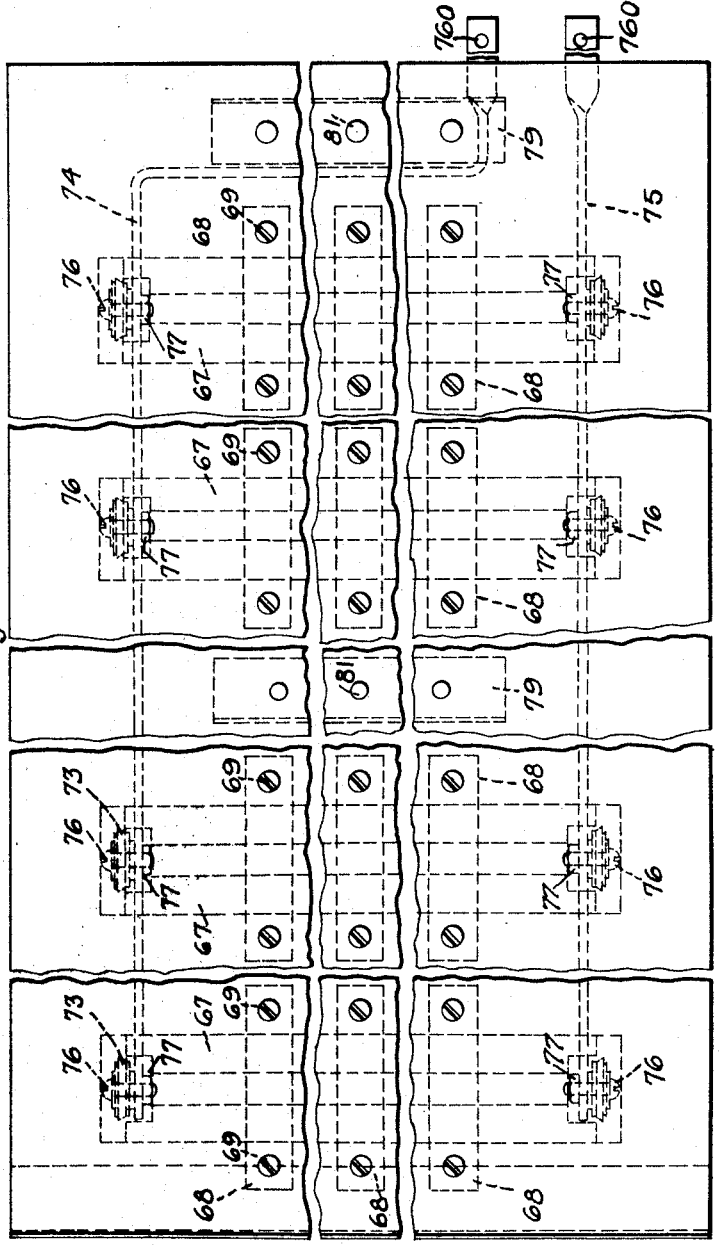
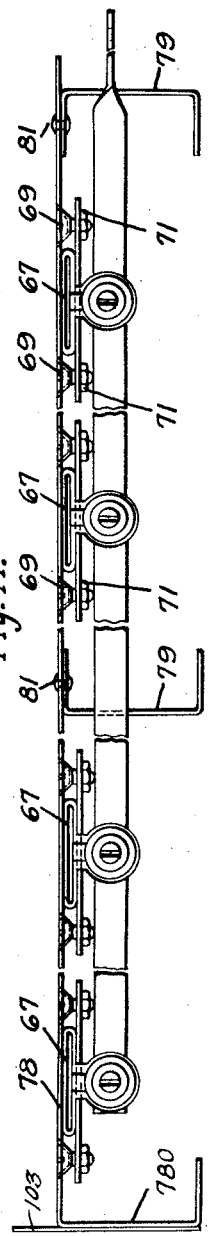
WITNESSES:
INVENTOR
Frank Thornton, Jr.
BY
ATTORNEY Patented Apr. 15, 1924.

1,490,243

UNITED STATES PATENT OFFICE.

FRANK THORNTON, JR., OF MANSFIELD, OHIO, ASSIGNOR TO WESTINGHOUSE ELECTRIC PRODUCTS COMPANY, A CORPORATION OF MICHIGAN.

SECTIONAL BAKE OVEN.

Application filed March 17, 1922. Serial No. 544,496.

*To all whom it may concern:*

Be it known that I, FRANK THORNTON, Jr., a citizen of the United States, and a resident of Mansfield, in the county of Richland and State of Ohio, have invented a new and useful Improvement in Sectional Bake Ovens, of which the following is a specification.

My invention relates to ovens and particularly to electrically heated baking ovens and it has for one of its objects to provide a unitary structure for a multiple-chamber baking oven.

Another object of my invention is to provide a multiple-chamber baking oven having a plurality of heat-insulating walls for each chamber to effectively heat-insulate the chambers from each other and to permit of a predetermined temperature being maintained in each chamber.

Another object of my invention is to provide a separate manual and a separate automatic control means for the heating elements of each chamber to permit of maintaining a substantially constant predetermined temperature in each chamber at all times.

Another object of my invention is to provide a thermally controlled motor-operated switch for automatically maintaining a predetermined temperature in an oven chamber.

Another object of my invention is to provide a compact assembly of the control devices mounted on the side of each unit of the oven.

In baking ovens employed in baking a variety of articles, it is highly desirable to have a plurality of baking chambers, heat-insulated from each other but combined into a single unitary structure wherein the units are located in superposed position relatively to each other. When so combined, the floor space occupied is relatively small and it is possible to operate each chamber at such predetermined temperature as will give the best product. For example, bread is usually baked at a temperature somewhat lower than that at which cookies are baked and, where a bake oven is to be employed in turning out a variety of baked goods, a multiple-chamber oven is almost indispensable if quantities of well baked goods of various kinds are to be produced on schedule time.

Another desirable feature is an automatic control of the individual heating units to provide a substantially constant predetermined temperature in any one of the oven chambers, not only during the baking periods but also during the intervening periods.

My invention embodies a multiple-chamber baking oven comprising a plurality of superposed oven chambers, each defined by heat-insulating walls, located on a supporting frame. Each of the walls is constituted by a single panel, the top, bottom, and side wall panels being interlocked with a rear wall panel, front and rear metal frames, together with bars connecting these frames, being employed to hold the wall panels in their proper operative positions relatively to each other. Means are provided to interlock the superposed units to prevent any lateral motion thereof relatively to each other.

A plurality of heating elements is located in each chamber adjacent to the top and the bottom thereof. each heating element comprising a plurality of spaced-apart heating units. Means are provided in combination with each heating element to insure an even distribution of heat, not only over the entire operative surface of each heating element, but also throughout the entire volume of each chamber.

A manually operable means and an automatic means thermally controlled by the chamber temperature are provided to control the energization of the heating elements to maintain a substantially constant temperature in each of the baking chambers at all times.

A ventilating means is provided for all of the chambers of the baking oven.

In the drawings,

Fig. 10 is a top plan view of a bottom heating element, and

Fig. 11 is a view, in side elevation, of the heating element illustrated in Fig. 10.

Figure 1:
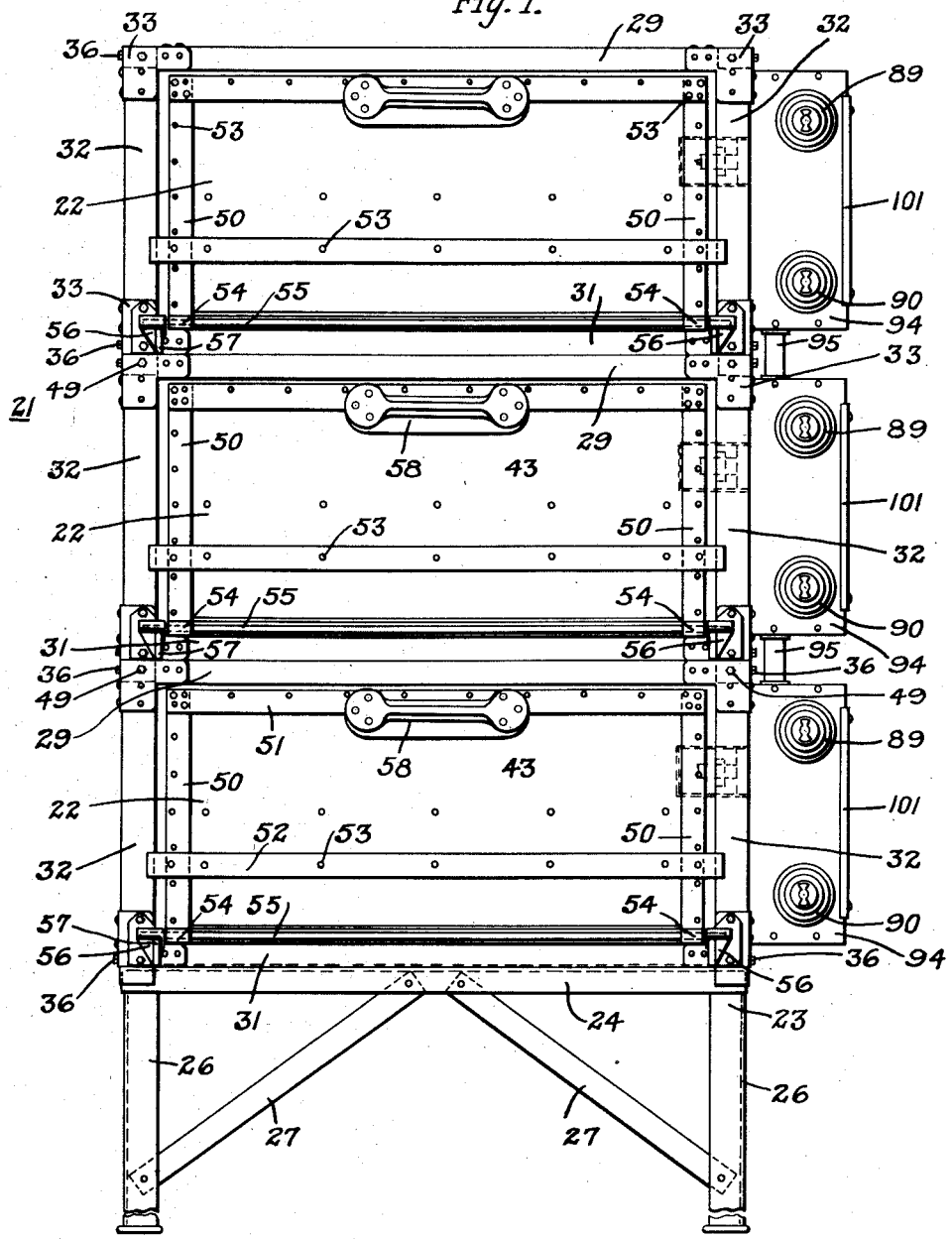
Figure 1 is a view, in front elevation, of a baking oven embodying my invention.

An electric baking oven, designated, as a whole, by the numeral 21, comprises a plurality of unitary superposed baking-oven units 22 which are located on a suitable metal supporting frame 23.

The supporting frame 23 comprises a plurality of horizontally extending front and rear angle bars 24 and a plurality of horizontally extending side angle bars 25 which are suitably secured against the top of vertically extending supporting angle-bar members 26 in such manner as to constitute a substantially rectangular frame. Bars 27 and 28 may have their ends suitably secured to the horizontally and to vertically extending angle bars to brace the frame.

Each of the superposed oven units 22 comprises a front frame which is composed of a horizontally extending top angle bar 29, a bottom angle bar 31 and vertically extending side angle bars 32, which are suitably connected, at their adjacent ends, by means of metal gusset plates 33, so that the assembled members constitute a substantially rectangular skeleton frame. A rear frame comprises similar horizontally extending angle bars 29 and 31 and vertically extending side angle bars 32 which are connected by metal gusset plates 33 in such manner that they constitute a substantially rectangular skeleton frame similar to the front frame. The front and rear frames are connected by a top angle bar 34 and a bottom angle bar 35, secured at their ends, to integral side portions of the gusset plates 33 by a plurality of bolts 36.

Each of the oven chambers 37 is surrounded or defined by a top heat-insulating panel 38, a bottom heat-insulating panel 39, two side heat-insulating panels 41, a rear heat-insulating panel 42 and a heat-insulating door panel 43. Each of the hereinbefore mentioned panels is composed of an outer sheet-metal plate 44 and an inner sheet-metal plate 45, which are maintained in spaced-apart relation not only by integral flange portions 46 but also by metal members 47 of substantially channel form, located between the two sheet-metal walls and suitably secured against one sheet-metal wall by a plurality of rivets 48. The rear panel 41 comprises, in addition to the hereinbefore described construction, an integral channel 44 extending around the periphery of the panel to permit of locating therein the rear end portions of the top, bottom and side panels to interlock them with the rear wall panel. The side panels 41 are provided with a substantially similar channel adjacent the top and the bottom edges to permit of so locating therein the side edge portions of the top and the bottom wall panel that the top and bottom panel are interlocked with the side panels.

Figure 2:
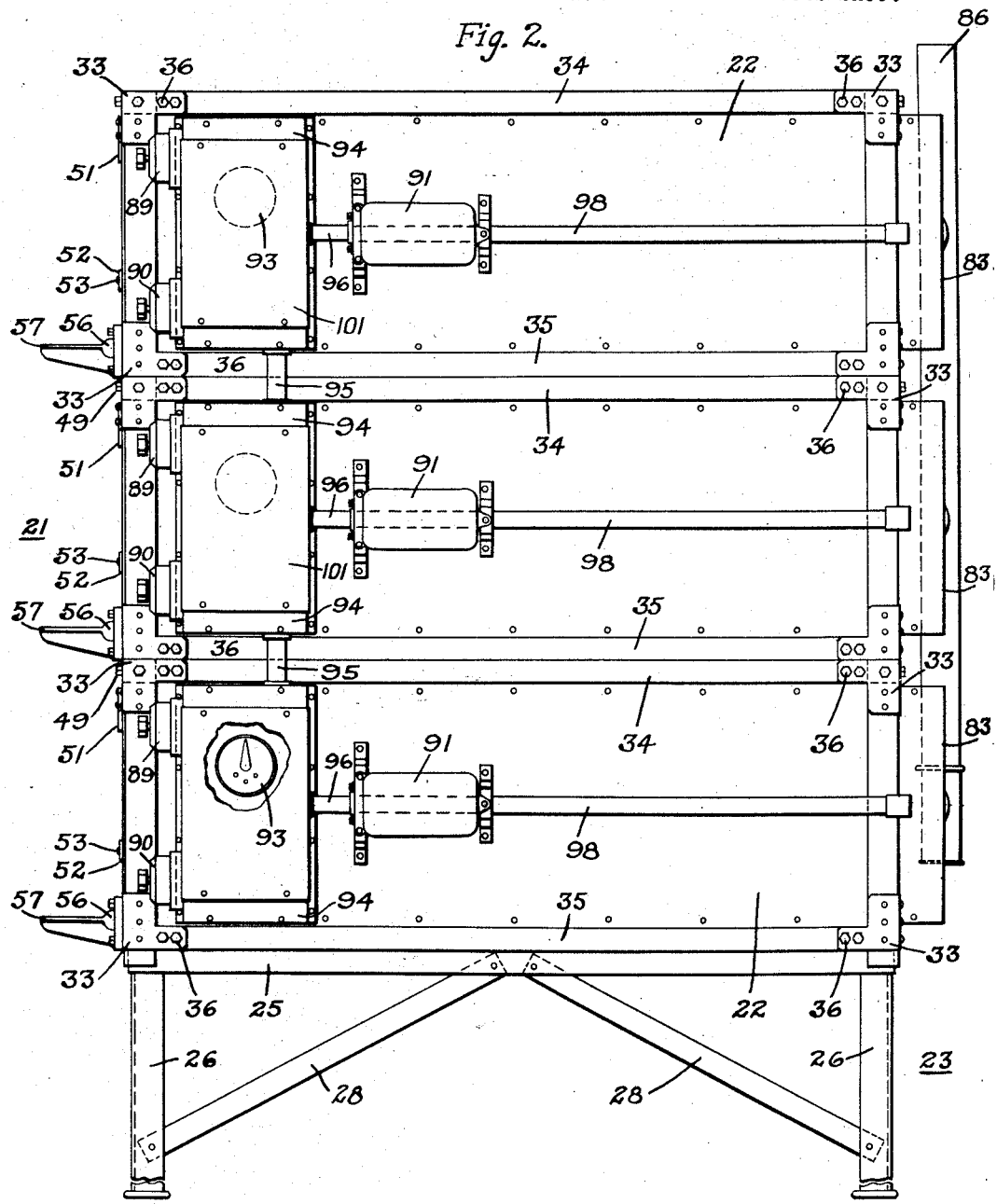
Fig. 2 is a view, in side elevation, of a baking oven embodying my invention.
Figure 3:
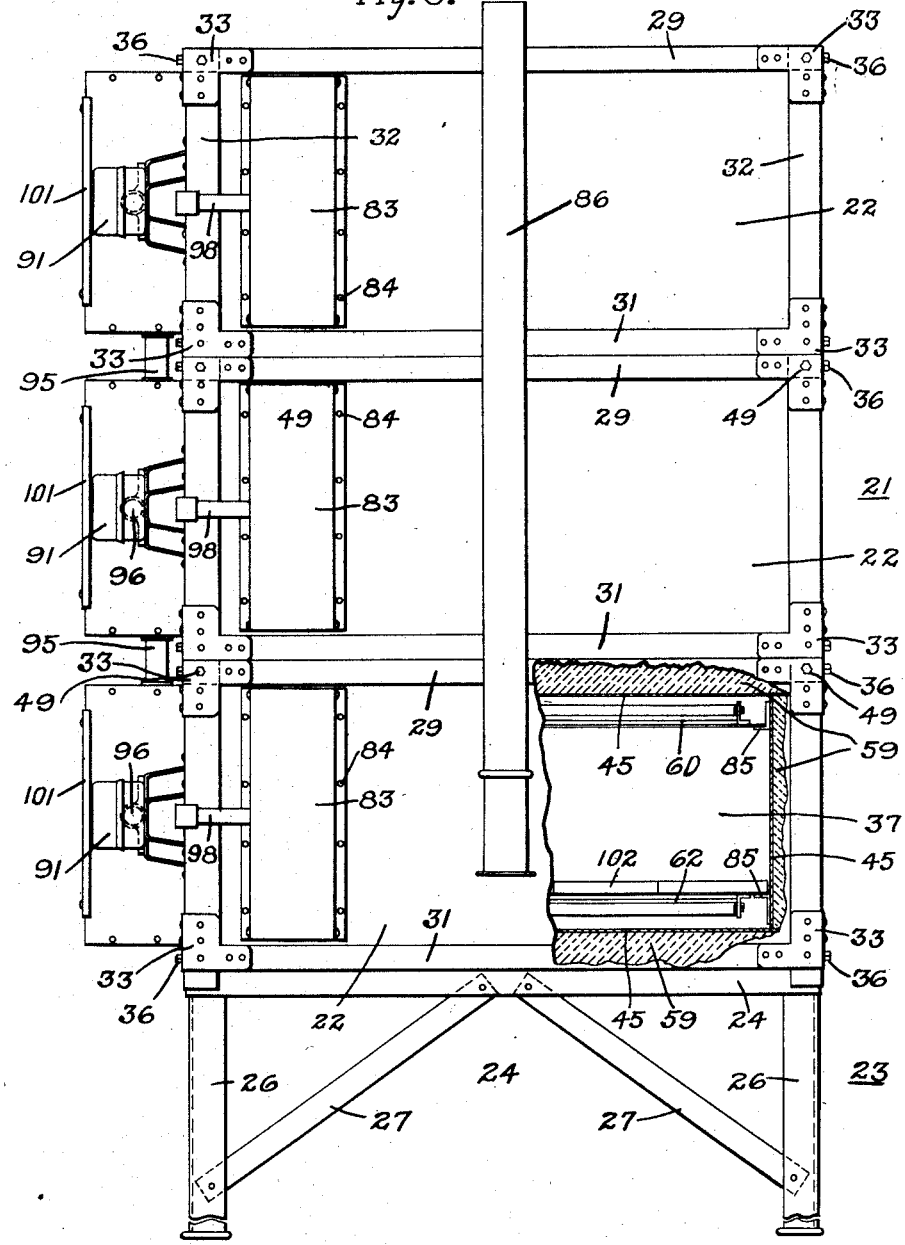
Fig. 3 is a view, in rear elevation, with portions cut away, of a baking oven embodying my invention.
Figure 4:
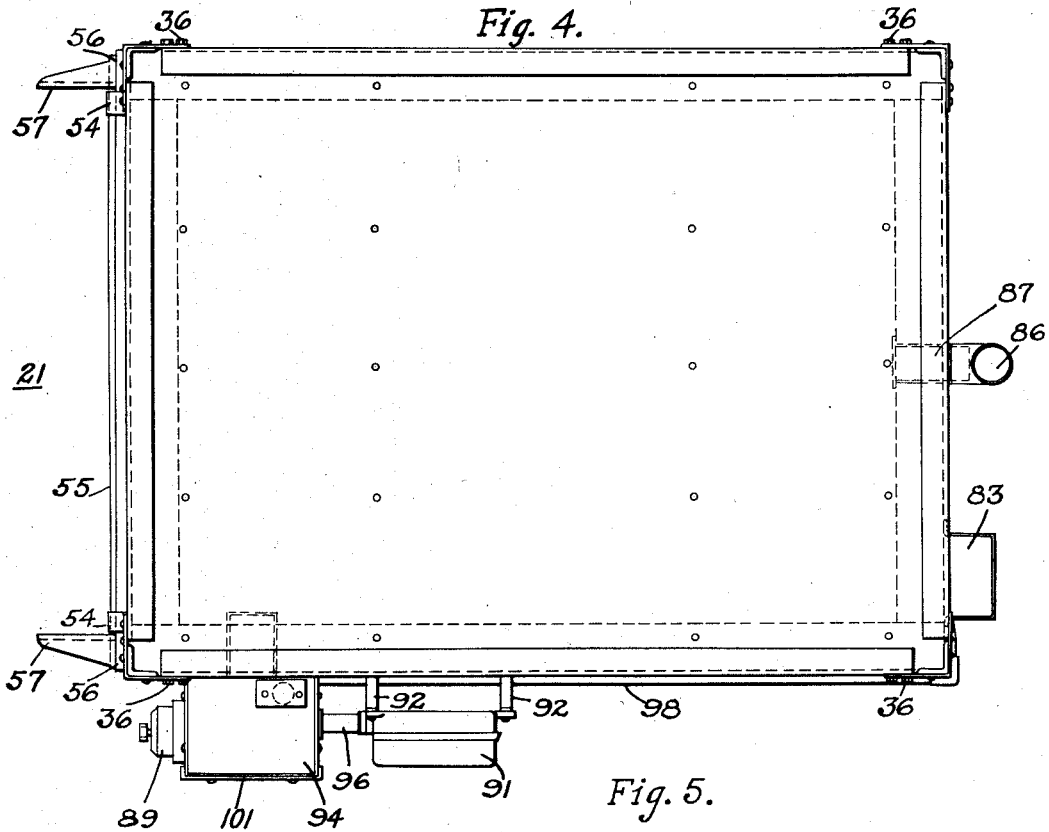
Fig. 4 is a top plan view thereof.

In assembling the individual oven units 22, the front and rear frame, as hereinbefore described, are built up separately, as are also the panels constituting the top, bottom, side and rear walls. The rear frame is then placed on a suitable horizontally extending support, the rear panel is placed in its proper operative position therein, the side-wall panels 41 are then placed in their proper operative positions relative to the rear-wall panel, with their rear edges located in the hereinbefore-described channel. The top and bottom wall panels are then placed in their proper operative positions, with their rear edges located in the channel of the rear-wall panel and with their side edges located in the channels of the side-wall panels, after which the front frame, hereinbefore described, is placed in its proper operative position, and the connecting angle bars 34 and 35 are placed in their proper operative positions, substantially as indicated in Fig. 2 of the drawings. If necessary, temporary clamping means may be employed to force the front and the rear end frames toward each other to obtain a predetermined overall dimension, after which the bolts 36 may be located in their proper operative positions to hold the front and rear frames tightly together. The construction of the front and rear frames and of the interlocking wall panels is substantially the same as that disclosed and claimed in a copending application, Serial No. 489,478, filed August 3, 1921, by J. D. Haynsworth, and assigned to the Westinghouse Electric Products Company.

In building up the front and the rear end frames, the vertically extending side angle bars 32 are so located, with reference to the top and the bottom gusset plates, that they extend a short distance below the bottom edge of the bottom gusset plates, and the top ends thereof are located below the top edge of the top gusset plates. When the lowermost oven unit 22 is placed upon the supporting frame 23, the four side angle bars 32 extend below the top edge of the angle members 24 and 25, thus interlocking the oven unit 22 with the supporting frame and preventing any lateral motion of one relatively to the other. The second and succeeding oven units 22 are also interlocked with the underneath oven units, as the side angle bars 32 extend below the top edge of the top gusset plates and are located within these plates, whereby any horizontal movement of one of the oven units relatively to the other is effectively prevented. Bolts 49 may also be employed to secure the lower end of the angle bars 32 against the gusset plates 33 to hold the oven units more securely in place relatively to each other.

The door panel 43 is provided with a plurality of spaced-apart vertically-extending flat bars 50 located adjacent the sides thereof, a top horizontally-extending bar 51 located adjacent the top edge thereof and a horizontally extending bar 52 located near the bottom edge thereof, all of these bars being suitably secured against the sheet-metal front of the panel by rivets or screws 53. The lower end of each of the bars 50 is provided with a curved portion 54 to constitute a bearing for a hinge bar 55 extending therethrough, which has its ends located in a plurality of hinge members 56 which may be suitably secured against the lower front gusset plates 33. The hinge members 56 are provided with an integral forwardly extending portion 57 which is adapted to constitute a rest for the ends of the bar 52 to permit of supporting the door 43 in a substantially horizontal position when it is opened by a handle member 58 secured thereto adjacent to the upper edge thereof.

All of the panels 38, 39, 41, 42 and 43 have spaces between the inner and outer sheet-metal walls filled with a suitable heat-insulating material 59, such as mineral wool.

Means for heating each of the oven chambers comprises a top heating element 60 and a bottom element 61, each of which will be described separately. The top heating element comprises a relatively thin sheet-metal plate 62 having a front upturned integral flange portion 63 and having also a plurality of sheet-metal angle bars 64 secured thereto by rivets 65 to stiffen the same. Openings 66 are provided in the plate 62 to permit convection currents of air to flow therethrough. A plurality of armored, relatively narrow, elongated flat heating units 67 are located on the upper surface of the plate 62 and extend laterally thereof in spaced-apart relation. Each of the units 67 is clamped against the plate 62 by a plurality of narrow metal strips 68 extending laterally of the heating units 67 the ends of each of the bars or strips 68 being engaged by machine screws 69 and a nut 71, the head of each of the screws 69 being located in depressions 72 in the plate 62 so that the lower surface of the plate 62 is substantially smooth. Each of the heating units 67 comprises a suitable heating unit which is known as a space heater and which may be of the type disclosed by Patent No. 1,155,167. Each unit is provided, at its opposite ends, with a terminal member 73 extending substantially at right angles to the plane of the heating unit to permit of connecting thereto bus bars 74 and 75, respectively, by bolts 76 and nuts 77 to conduct current to and from the individual heating units. The ends of the two bus bars 74 and 75 are located relatively close together adjacent to one side of the plate 62 and are provided with openings 76 to permit of bolting thereon a suitable supply-circuit conductor (not shown).

The bottom heating element 61 comprises a relatively thin sheet-metal plate 78 having an integral depending flange portion 780 and being provided with a plurality of members 79 of substantially channel section secured thereto by rivets 81 to stiffen the same. A plurality of heating units 67 are located on the under surface of the plate 77 in spaced-apart relation and extending laterally of the plate, the number of units employed in the bottom heating element being greater than that employed in the top heating element to equalize the temperature in the volume of each of the oven chambers. Each of the units 67 is secured against the plate 78 in substantially the same manner as hereinbefore described in connection with the top heating unit. Bus bars 74 and 75, of substantially the same construction, are connected to the terminals of the heating units 67, substantially as hereinbefore described in connection with the top heating element.

Figure 7:
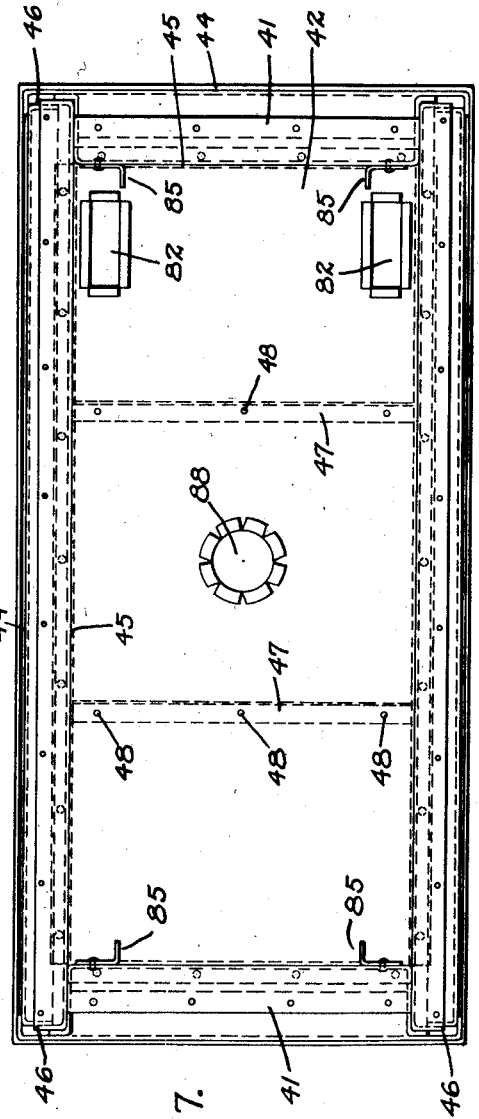
Fig. 7 is a view, in front elevation, of one of the oven units, the front frame and door being removed therefrom.
Figure 8:
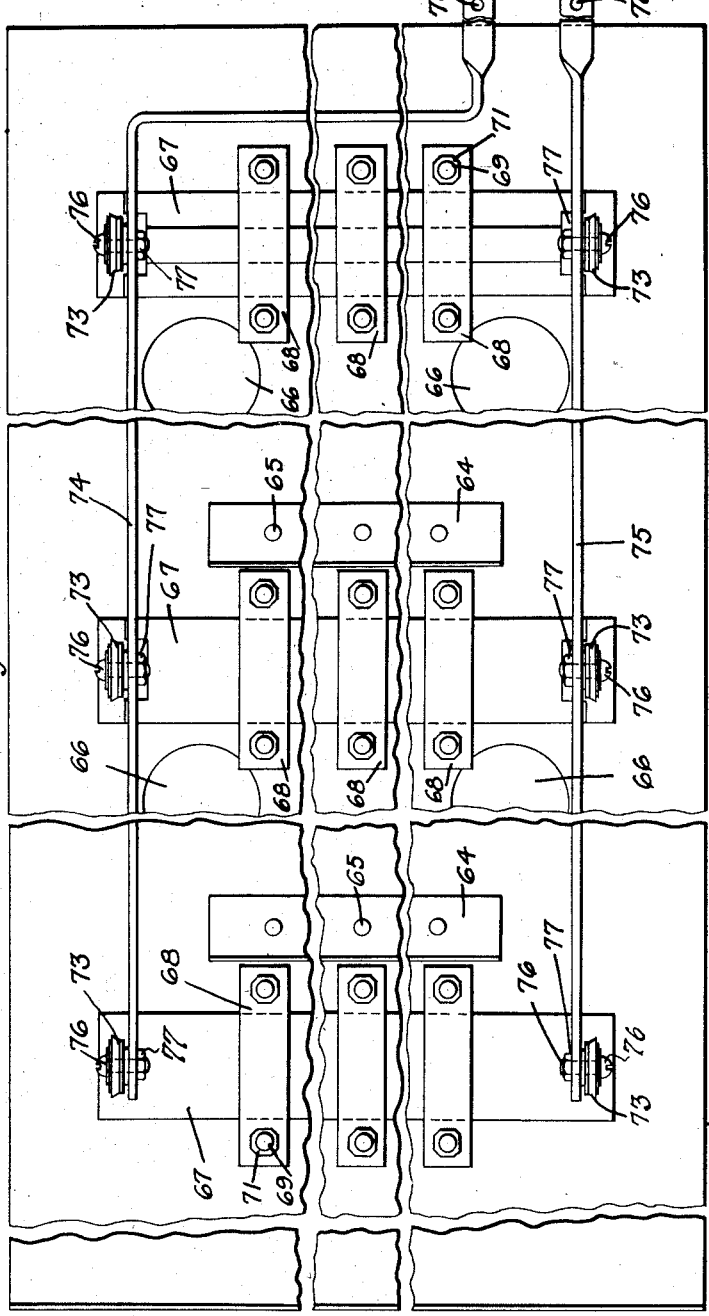
Fig. 8 is a top plan view of one of the top heating elements.
Figure 9:
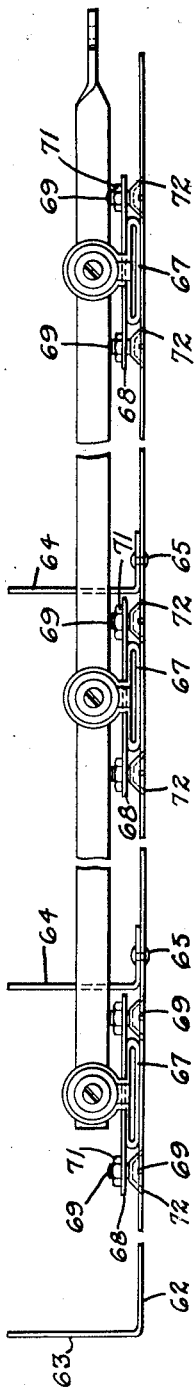
Fig. 9 is a view, in side elevation, of the heating element illustrated in Fig. 8.

Openings 82, substantially rectangular in contour, as illustrated more particularly in Fig. 7, are provided in the rear panel 42, to permit of two sets of bus bars 74 and 75 extending therethrough to permit of their being connected to the conductors of a suitable supply circuit mounted on, or located at the outside and rear of, the built up oven 21. The ends of the supply-circuit conductors may be located in a relatively small cover constituted by sheet metal members 83 bent to substantially box shape and secured against the outside of the rear panel 42 by screws 84.

Supporting means for the top and for the bottom heating elements comprise a sheet-metal member 85, of substantially L-shape in cross-section, suitably secured against the inner sheet-metal wall of each of the side panels, adjacent the top and bottom edges thereof, by any suitable means.

Means for ventilating each of the oven chambers comprises a sheet metal chimney 86 which is connected by horizontally extending branch portions 87 to each chamber, the branch portions 87 extending through openings 88 provided in each of the rear panels 42.

Figure 5:
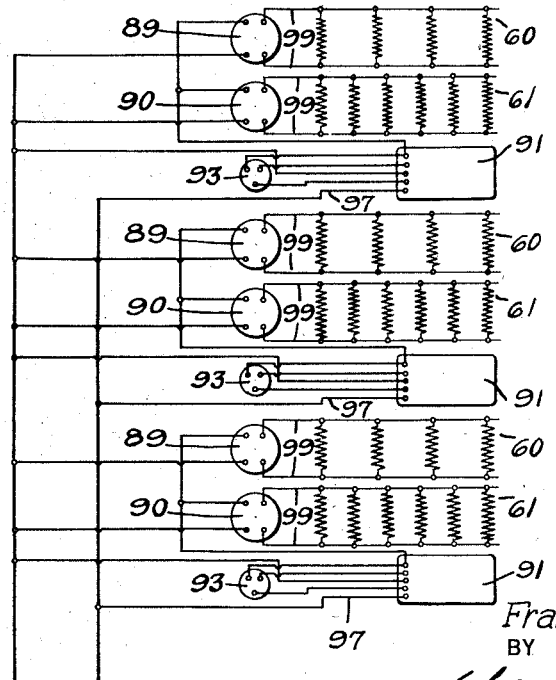
Fig. 5 is a diagram of the connection of the electric circuits of the various heating elements and of the automatic control devices.
Figure 6:
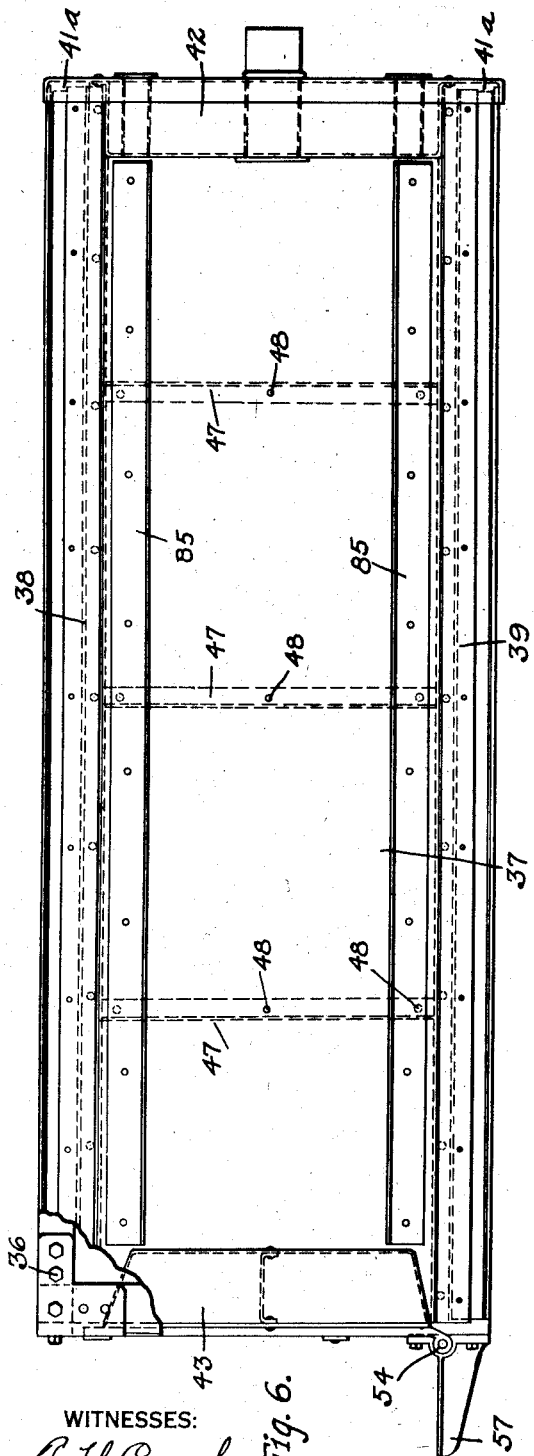
Fig. 6 is a view, in side elevation, of one of the oven units, substantially all of one side panel being removed therefrom.

Fig. 5 illustrates, schematically, the diagram of connections of the heating elements of the built-up oven wherein a manually operable switch 89 is employed to control the energization of each of the top heating elements 60, and a similar switch 90 is employed to control the energization of the bottom heating elements 61 in each of the chambers. In order to automatically control the energization of the two heating elements in each of the oven chambers, I provide a motor-operated enclosed switch 91 mounted against the side of each of the oven units by any suitable securing means, here indicated as supporting members 92 extending laterally of the outer surface of the side panel. The motor-operated switch 91 is not a part of my invention and is more particularly claimed and described in a copending application, Serial No. 474,822, filed June 3, 1921, by C. Aalborg and O. A. Colby and assigned to the Westinghouse Electric & Manufacturing Company.

In order to automatically control the motor-operated switch 91, I provide, in operative relation to each of the oven chambers, a thermostatic controlling member 93 which may be of any suitable or desired type employing a bimetallic strip operatively engaging a high and a low contact terminal. I prefer, however, to employ a thermostatic means of the character disclosed and claimed in a copending application, Serial No. 439,409, filed by B. H. Smith, January 24, 1921, and assigned to the Westinghouse Electric & Manufacturing Company, to which reference may be had for the operative details of the device. In general, the thermostatic strip is subjected to the temperature of the chamber and is thereby caused to engage either the high contact terminal of the device, whereupon the motor-operated switch 91, operatively associated therewith, is caused to interrupt the energizing circuit through the heating elements 60 and 61 associated therewith or it engages the low contact terminal of the device, whereupon the switch 91 is actuated to close the circuit through the heating elements 60 and 61 to again raise the temperature in the oven chamber. This system, in its simplest elements, has been made the subject of a separate application, Serial No. 328,032, filed Oct. 2, 1919, by R. A. Bolze and E. W. Denman, and assigned to the Westinghouse Electric & Manufacturing Company.

An open-front box member 94 of thin sheet metal is suitably secured against the side of each of the oven units immediately in front of the switch 91 and is effective to cover the thermostatic control member 93 to suitably insulate the same against the direct influence of the surrounding air, so that it may more readily follow the temperature of the oven chamber. The switches 89 and 90 may be mounted on the front wall of the respective boxes 94. A suitable conduit 95 may be employed to carry the supply-circuit conductors from one box 94 to the other. A suitable conduit 96 connects each of the boxes 94 to the associated switch structure 91 to provide a means for holding the switch-energizing conductors, designated, as a group, by the numeral 97. A conduit 98 extends from each of the boxes 94 horizontally along the side of the oven unit and around the back to hold the heating element energizing conductors, designated by the numeral 99. The conductor construction may be of any suitable or desired type to obtain the desired result.

Each of the boxes 94 is provided with a removable cover member 101 to permit of ready access to the box 94 to adjust the thermostatic member 93, as will be seen more particularly by reference to Fig. 2, wherein one of the boxes 94 is illustrated as having the cover 101 removed therefrom to illustrate the thermostatic control member 93.

In order to prevent a relatively large drop in temperature, whenever relatively cold pans of bread or other food to be baked are placed upon the lower heating element, I provide a layer 102 of a suitable refractory heat-storing material comprising a plurality of flat slabs to assist not only in distributing the heat generated by the relatively narrow and spaced-apart heating units on the bottom heating element but also to prevent a relatively large decrease in the temperature of the bottom heating element whenever a fresh quantity of material to be baked is placed thereon. The plate 78 may be provided with a strip 103 of thin sheet metal suitably secured against the flange 780 to hold the slabs of refractory material on the plate 78 while material is being placed in or removed from the oven chamber. As hereinbefore described, the supporting plate for each of the upper heating elements is provided with a plurality of openings therethrough to permit of convection currents of air flowing therethrough to assist in equalizing the heat not only over the horizontally extending surface of the upper heating element but also to assist in equalizing the temperature throughout the entire volume of each of the heating chambers.

The baking oven embodying my invention provides a plurality of superposed baking chambers, each of which is provided with a plurality of enclosing heat-insulating walls which effectively insulate the individual chambers from each other and are also effective in reducing the amount of heat which may be radiated from the walls of the chambers, but, in addition thereto, are especially effective in maintaining a relatively high temperature in the individual oven chambers, even when the oven units are not in use and the heating elements may not be energized. Thus, if the operator does not desire to energize any of the heating elements during such time as the entire structure is not employed in baking operations, he may de-energize all of the heating elements by the manually operable switches and still maintain a relatively high temperature in the oven chambers, so that only a relatively short time and a relatively small amount of electrical energy is necessary to again bring the temperature of any or all of the oven chambers to that required for baking operations. Relatively simple means are provided for manually and for automatically controlling the temperature of each of the oven chambers to maintain any predetermined temperature therein, irrespective of whether the oven unit is being employed in baking operations or not, the automatic controlling means for each set of heating elements being controlled by the temperature of the respective co-operating oven chamber.

Various modifications may be made in the device embodying my invention without departing from the spirit and scope thereof and I desire that only such limitations shall be placed thereon as are imposed by the prior art or are specifically set forth in the appended claims.

I claim as my invention:

1. In an electrically heated oven, in combination, a unitary structure comprising a plurality of superposed baking chambers heat-insulated relatively to each other, a single supporting means for all of said chambers, and a single ventilating means for all of said chambers.

2. In an electrically heated oven, in combination, a unitary structure comprising a plurality of superposed baking chambers, each having heat-insulating walls enclosing the same, a supporting means for said structure, heating elements in said chambers, a single electric supply circuit for said oven, and a plurality of automatic means, each controlled by the temperature of the baking chamber with which it is associated for maintaining a predetermined temperature in each of the baking chambers.

3. In an electrically heated baking oven, in combination, a unitary structure comprising a plurality of superposed baking chambers, each having a plurality of heat-insulating walls enclosing the same, a plurality of heating elements in each of said chambers located respectively adjacent the top and the bottom thereof, and automatic means operatively associated with each of said chambers, and responsive to the temperature thereof for maintaining a predetermined temperature in each of the chambers.

4. In an electrically heated oven, in combination, a unitary structure comprising a plurality of superposed baking chambers each having heat-insulating walls enclosing the same, a supporting means for said structure, heating elements in said chambers, a single electric supply circuit for said oven, and means mounted on the outside of a wall of each of the baking chambers and thermally responsive to the temperature of said chamber, for maintaining a substantially constant temperature in each of said chambers at all times.

5. In an electrically heated oven, in combination, a unitary structure comprising a plurality of superposed baking chambers each having heat-insulating walls enclosing the same, a supporting means for said structure, heating elements in said chambers, a single electric supply circuit for said oven, and combined manual and automatic means mounted on a wall of each of said chambers for maintaining a substantially constant temperature in each of said chambers at all times.

6. In an electrically heated oven, in combination, a unitary structure comprising a plurality of superposed baking chambers each having heat-insulating walls enclosing the same, a supporting means for said structure, heating elements in said chambers, a single electric supply circuit for said oven, and means comprising an automatically actuated motor-operated snap switch for maintaining a substantially constant temperature in each of said baking chambers at all times.

7. In an electrically heated oven, in combination, a unitary structure comprising a plurality of superposed baking chambers, a single heat-insulating panel constituting each of the several walls enclosing the respective chambers and the panels constituting the top, bottom and side walls being interlocked with the panel constituting the rear wall, a supporting member, and means for holding the panels enclosing a baking chamber in proper operative position relatively to each other and on said supporting member.

8. In an electrically heated baking oven, in combination, a unitary structure comprising a plurality of superposed baking chambers, each having a plurality of heat-insulating walls enclosing the same, and electric heating means in each of said chambers so disposed as to cause the temperature in said chambers to be substantially uniform throughout the same.

9. In an electrically heated baking oven in combination, a unitary structure comprising a plurality of superposed baking chambers, each having a plurality of heat-insulating walls enclosing the same, and electric heating means in each of said chambers, one being located adjacent to the top and one being located adjacent to the bottom thereof, the top heating means in each chamber being of lesser strength than the bottom one to cause the temperature in each of said chambers to be substantially uniform throughout the same.

10. In an electrically heated baking oven, in combination, a unitary structure comprising a plurality of superposed baking chambers, each having a plurality of heat-insulating walls enclosing the same, an electric heating means adjacent to the top, and a second heating means adjacent to the bottom, in each chamber, said heating means being supported by certain of said walls, and means for supporting articles being baked, said means being located closely adjacent to and above said lower heating means and serving as a heat-storage means for said lower heating means.

11. In an electrically heated baking oven, in combination, a unitary structure comprising a plurality of superposed baking chambers, each having a plurality of heat-insulating walls enclosing the same, an electric heating means in each of said chambers located adjacent to the top thereof, a second heating means in each of said chambers located adjacent to the bottom thereof, each of said heating means comprising a plurality of spaced-apart elongated relatively narrow heating units, and means operatively associated with each of said heating means for insuring a substantially uniform distribution of heat over each of said heating means.

12. In an electrically heated baking oven, in combination, a unitary structure comprising a plurality of superposed baking chambers, each having a plurality of heat-insulating walls enclosing the same, a front frame, a rear frame, and means operatively connecting the front and rear frames of each set of walls to maintain them in their proper operative positions relatively to each other, said front and rear frames having means for interlocking the superposed baking chambers.

In testimony whereof, I have hereunto subscribed my name this first day of March, 1922.

FRANK THORNTON, Jr.